Oct. 22, 1940.   C. W. NEUFELD   2,219,209
ELECTRODIALYSIS OF PAPAIN
Filed Nov. 18, 1937
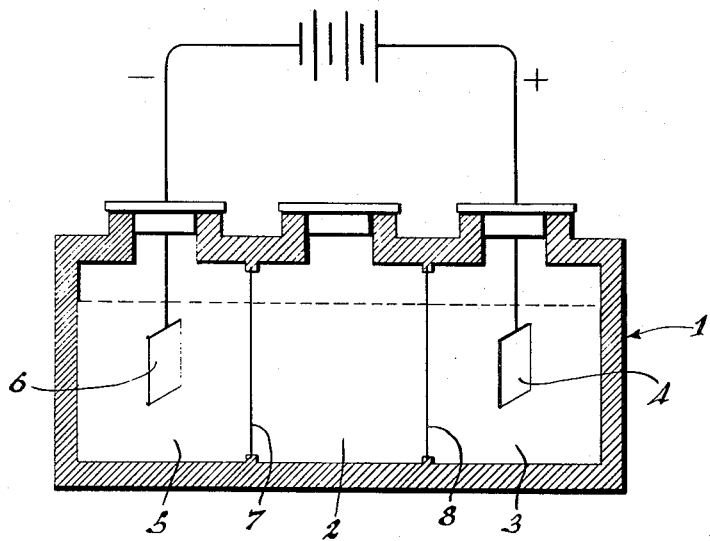
INVENTOR.
Carl W. Neufeld
BY
Wood & Wood ATTORNEYS.

Patented Oct. 22, 1940

2,219,209

UNITED STATES PATENT OFFICE 2,219,209

ELECTRODIALYSIS OF PAPAIN

Carl W. Neufeld, Mariemont, Ohio, assignor to The Perfect Manufacturing Company, Cincinnati, Ohio, a corporation of Ohio Application November 18, 1937, Serial No. 175,297

4 Claims. (Cl. 204—1)

This invention relates to a new product which is derived from papain. The invention likewise relates to a method or process for obtaining the material and to apparatus adapted to the practice of the process.

The strict chemical composition of the material which is the subject matter of this invention has not been determined so that it must necessarily be defined in relation to its source and to the method of obtaining it.

Crude papain is a product of vegetable origin derived from latex exuded by the shrub, *Carica papaya* Lynn. The crude material is a solid, gummy or resinous substance and is imported into the United States from the Far East where the shrubs grow in some abundance. The material is characterized most noticeably by its obnoxious odor. The crude papain varies considerably in composition from one batch to another, and while a percentage of the material is soluble in water precipitates of a crystalline or amorphous nature occur after a short period of time and the liquid putrifies rapidly.

The present invention is directed particularly to the purification or treatment of papain to enable its preparation into a stable aqueous solution adapted for the purpose of tenderizing meats and similar fibrous foods. In copending application Serial No. 61,063, filed January 27, 1937, and entitled "Comestibles," of which I am a joint applicant there is disclosed a stable, aqueous composition of papain which has been found to be suited for this purpose. Of course, the papain which is used for the treatment of foods to increase their palatability must be free from any obnoxious or unpleasant odors or tastes, as distinguished from the papain medicinal compounds in which such factors as taste or odor are not particularly important.

While I am aware that native Indians of the localities to which the papaya shrub is indigenous have used the leaves of the plant in which to wrap meats and the like for tenderizing them, it is my understanding that the stable, aqueous food product disclosed in my said copending patent application is the first to have been produced for use by housewives and chefs in the more urban localities. This invention is directed particularly to the treatment of papain to enable its use in such stable, aqueous solutions.

I have discovered that crude papain contains a variety of organic and inorganic substances intermixed or associated with the actual papain enzyme. Some of the impurities are present primarily in the crystalloid state, whereas the papain enzyme is of colloidal nature. Aside from the inorganic water soluble impurities I have found that the crude papain also contains an organic, water soluble, oleo-resinous substance having an exceedingly obnoxious odor as well as a bitter and very unpleasant taste. The substance appears to be readily oxidizable and so far as I am able to determine accounts for the coloring matter in the crude material.

The method of the present invention contemplates the separation of the papain enzyme from the organic and inorganic substances with which it is contaminated. Briefly, my method for converting crude papain into a product commercially suitable for use in conjunction with foods comprises separating the enzyme of crude papain from the impurities by virtue of the difference in specific conductivity between the papain enzyme and the impurities when both constituents are in aqueous solution. More specifically, the present invention is predicated upon the concept of dialyzing an aqueous solution of crude papain to effect the separation of the active enzyme colloid from the useless or inactive organic and inorganic substances with which it is associated in the crude state.

I have found that certain impurities in an aqueous extract of crude papain which is subjected to electrodialysis will travel through a dialyzing membrane to an anode, while other of the impurities will travel through a dialyzing membrane to a cathode and that all or substantially all of the active enzyme is recoverable upon dialyzation. During the electrodialyzing process most or all of the oleo-resinous substance proceeds to a locality adjacent the anode and the solution at this place becomes increasingly dark in color as the operation proceeds. Moreover, I have found that the liquid adjacent the anode does not contain the active enzyme, but that some of the enzyme principle may be found under certain conditions in the locality of the cathode depending on the permeability of the dialyzing membrane.

To effect the separation of the components of crude papain I have found that a three-cell electrodialyzing apparatus is particularly suitable, in that it permits passage of negatively charged impurities to the anode, and positively charged impurities to the cathode, and it permits a major portion, at least, of the active enzyme principle to remain unaffected in a zone intermediate the cathode and the anode.

The apparatus which I prefer to use in the practice of the present invention is disclosed in the drawing. In this drawing the electrodialyzing apparatus is indicated generally at 1. This apparatus comprises a center cell 2, an anode cell 3 having an anode 4 and a cathode cell 5 having a cathode 6. Dialyzing membranes 7 and 8 respectively segregate the center cell from the anode and cathode compartments. The anode of the apparatus preferably is made of carbon or of platinum and the cathode may be made of stainless steel or platinum and may be in the form of wire screening or of a sheet. Both the anode and the cathode preferably are designed to provide large surfaced areas. The cells of the compartments are made of a material which is inert in respect to the solution being dialyzed and glass, acid resisting vitreous enamel ware, or stainless steel for example, is suitable.

The following example will be of assistance to the skilled in the art in understanding how my new papain product is produced by my preferred method of separation:

An aqueous extract is made from crude papain, which may be first powdered or comminuted so as to be more easily dissolved in the water. In the commercial practice of the invention, to prepare a papain extract suitable for use in tenderizing meats and the like, I prefer to use a concentration of crude papain in the extract to be dialyzed that will provide the proper amount of active papain enzyme in the final dialyzed solution remaining in the center cell of the apparatus upon completion of a process. For such results I prefer to use approximately 0.02 to 0.03 part of crude papain, by weight, for each part of water. Dialyses of such a solution provides a final product containing approximately .8% of proteolytic active papain enzyme.

The watery extract made from crude papain is filtered to remove the insoluble vegetable fibrous matter and the like and is introduced into the center cell 2 of the apparatus. Water, preferably distilled water, is introduced into the anode and cathode compartments respectively. Then, direct current is applied across the anode and cathode, while the content of the anode and cathode cells as well as center cell are stirred to avoid excessive concentration of impurities and enzymes of materials in the vicinities directly adjacent the membranes.

I have found that it is preferable to conduct dialyses with approximately 40 to 50 volts D. C. at the start of the operation. The voltage may increase gradually as dialysis proceeds up to as high as 300 to 320 volts or more toward the end of the operation with corresponding decrease of current. If the voltage is too high at the start then the dialyzing membranes may become clogged, the liquid in the apparatus becomes heated and danger is encountered of destroying the proteolytic activity of the enzyme. The current at the start of operations, depending of course upon the concentration of papain, the pH value of the solution and other factors, is approximately 25 milliammeters.

The electrodialysis of the crude papain preferably is conducted at approximately 5.3 to 5.7 pH for best results. Moreover, the papain enzyme seems to exhibit its greatest proteolytic activity at approximately 5.3 pH and for this reason electrodialyses is conducted so that this value is obtained in the final product. As dialysis proceeds the cathode cell becomes alkaline and the anode cell, where the oleo-resinous substances are sequestered, becomes progressively acid. In order to avoid too great a concentration of alkalinity or acidity in the cathode or anode compartments, so as to prevent degration of the dialyzing membranes, the contents of the anode and cathode cells may be removed periodically and replaced with fresh water. However, in order to maintain balanced conditions the dilution of liquids in the anode and cathode compartments may be adjusted or controlled by the continual addition and removal of fresh water.

Dialyzation is continued for a period of anywhere from 12 to 36 hours, depending upon the concentration of crude papain in the starting solution, until the solution in the center cell contains the desired amount of active papain enzyme.

While I prefer to use a concentration of approximately .02 to .03 part of crude papain to each part of water to make a product suited to the specific purpose of tenderizing meats, the method of the present invention may be used to effect the electrodialyzation of solutions containing very much greater percentages of crude papain. For example, a 20% solution of crude papain may be used if desired. However, the greater the amount of crude papain used in preparing the original extract the more difficult the product is to handle. A solution containing 20% of crude papain is difficult to filter on account of the vegetable sludge which is present and the time for purification and separation by electrodialysis is increased substantially.

In the practice of the invention the dialyzing membrane may be any suitable, semiporous pellicle which possesses the capacity to permit passage of crystalloid impurities therethrough. Various types of dialyzing membranes permit varying amounts of the colloidal enzyme principle to pass through the membrane together with the impurities. I have determined through dialyses operations, carried out under various pH conditions, that with different types of membranes the degree of penetration of negatively charged impurities into the anode cell and positively charged impurities into the cathode cell will vary considerably.

I have discovered that normal regenerated cellulose hydrate, or such materials known in the art as normal "Cellophane" are peculiarly well suited to use as membranes in the practice of the present invention for purifying papain. In using regenerated cellulose membranes of about .001 inch thick I have found that the yield of purified enzyme recoverable or present in the center cell after dialyzation is approximately 85% or more than the papain enzyme present in the crude material from which the starting extract was made. For example, I have found that about 34% of active enzyme remains in the center cell after dialyses. Crude, ordinary papain will contain not substantially more than 41% of enzyme, the so-called thread papain about 38%, more or less, and the better grades of white papain from Siam and Ceylon may contain 53% of material.

By reason of the low cost of regenerated cellulose hydrate and by reason of the high yield of pure enzyme which is obtainable when the regenerated cellulose hydrate is used as membrane material, this material is preferred in the practice of the invention. Other membranes, however, may be used in place of regenerated cellulose, such as parchment, gold-beaters' skin, porous stone filled with silicum dioxide gel, collodion, etc. The so-called moisture proof regenerated cellulose films, however, are treated so as to be substantially impermeable and this moisture proofing treatment disturbs the utility of the films as membranes in my present apparatus.

The separation of the components of crude papain, which is effected by virtue of their difference in specific conductivity in aqueous solution, is relatively simple to conduct with the proper apparatus, particularly when regenerated cellulose film is employed for the membranes. In the foregoing example I have exemplified the controls of concentration, current and voltage which preferably are to be used. Those skilled in the art readily will understand the variations to which the present invention is susceptible.

Having described my invention, I claim:

1. The method of preparing papain which may be admixed with water to provide a stable aqueous solution devoid of obnoxious odor, which consists in electrodialyzing an aqueous solution of crude papain through a dialyzing membrane of normal Cellophane.

2. A new method of obtaining papain enzyme which is capable of being admixed with water to provide a stable solution, which comprises, preparing an aqueous solution of crude papain and separating the enzyme from the impurities through a membrane of normal Cellophane by virtue of the difference of specific conductivity between the papain and the impurities, by impressing an electric current upon the solution.

3. A process of preparing active papain enzyme which is capable of being admixed with water to produce a stable, odorless aqueous solution from crude papain gum, which consists in preparing an aqueous extract of the crude papain gum and then dialyzing this extract, through a membrane of normal Cellophane by impressing an electric current upon the extract to effect the separation of the active enzyme from the impurities by virtue of the difference in specific conductivity between the active enzyme and the impurities.

4. A method of recovering purified papain which is capable of being admixed with water to provide a stable aqueous solution from crude papain gum, which comprises, preparing an aqueous extract of crude papain gum and then dialyzing this extract through a dialyzing membrane of normal Cellophane.

CARL W. NEUFELD.